US011233676B2

(12) United States Patent
Zhang et al.

(10) Patent No.: US 11,233,676 B2
(45) Date of Patent: Jan. 25, 2022

(54) CONTROL SIGNALING FOR SOUNDING REFERENCE SIGNAL (SRS)

(71) Applicant: Apple Inc., Cupertino, CA (US)

(72) Inventors: Yushu Zhang, Beijing (CN); Alexei Davydov, Nizhny Novgorod (RU); Hong He, Sunnyvale, CA (US); Gang Xiong, Portland, OR (US); Sameer Pawar, Santa Clara, CA (US); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/638,089

(22) PCT Filed: Aug. 9, 2018

(86) PCT No.: PCT/US2018/046053
§ 371 (c)(1),
(2) Date: Feb. 10, 2020

(87) PCT Pub. No.: WO2019/032855
PCT Pub. Date: Feb. 14, 2019

(65) Prior Publication Data

US 2020/0204406 A1 Jun. 25, 2020

Related U.S. Application Data

(60) Provisional application No. 62/620,178, filed on Jan. 22, 2018.

(30) Foreign Application Priority Data

Aug. 11, 2017 (WO) ................ PCT/CN2017/097167
Oct. 3, 2017 (WO) ................ PCT/CN2017/105239

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04L 5/0092* (2013.01);
(Continued)

(58) Field of Classification Search
CPC ......................... H04W 72/0446; H04L 5/0092
See application file for complete search history.

(56) References Cited

U.S. PATENT DOCUMENTS

2013/0121280 A1* 5/2013 Ouchi .................. H04L 5/0048 370/329
2014/0247789 A1* 9/2014 Li ........................ H04L 5/0058 370/329

(Continued)

OTHER PUBLICATIONS

International Search Report and Written Opinion, directed to International Application No. PCT/US2018/046053, dated Nov. 23, 2018, 10 pages.

(Continued)

*Primary Examiner* — Fahmida S Chowdhury
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry and a second circuitry. The first circuitry may be operable to process a message carrying an indicator to indicate a selection of a Sounding Reference Signal (SRS) resource set, wherein the message is received from a gNB. The second circuitry may be operable to generate an SRS transmission, based on the indicator. The apparatus may comprise an interface to send the SRS transmission to a transmission circuitry.

24 Claims, 12 Drawing Sheets

Trigger for precoded SRS
Precoded SRS
UL grant (non-codebook based scheme) (slot n1)
Trigger for non-precoded SRS
Non-precoded SRS
UL grant (codebook based scheme) (slot n2)
202a
204a
202b
202c
204b
202d
Time

(51) Int. Cl.
*H04W 72/04* (2009.01)
*H04W 72/14* (2009.01)
*H04W 80/08* (2009.01)

(52) U.S. Cl.
CPC ....... *H04W 72/0446* (2013.01); *H04W 72/14* (2013.01); *H04W 80/08* (2013.01)

(56) References Cited

U.S. PATENT DOCUMENTS

| | | | | |
|---|---|---|---|---|
| 2019/0173534 | A1* | 6/2019 | Kakishima | H04W 52/24 |
| 2019/0349864 | A1* | 11/2019 | Zhang | H04W 52/325 |
| 2020/0059898 | A1* | 2/2020 | Osawa | H04W 74/0833 |
| 2020/0162289 | A1* | 5/2020 | Ahn | H04L 5/0094 |
| 2020/0336264 | A1* | 10/2020 | Faxer | H04B 7/0456 |
| 2021/0007060 | A1* | 1/2021 | Chen | H04B 7/0626 |

OTHER PUBLICATIONS

Huawei, Hisilicon, "UL SRS design for beam management, CSI acqusition," 3GPP TSG RAN WG1 Meeting #89, R1-1706938, Hangzhou, China, 2017, Agenda Item 7.1.2.4.4, Retrieved from the Internet at http://www.3gpp.org/ftp/Meetings_3GPP_SYNC/RAN1/Docs/, 9 pages.

Catt, "Further considerations on SRS design," 3GPP TSG RAN WG1 NR Ad-Hoc#2, R1-1710070, Qingdao, P.R. China, 2017, Agenda Item 5.1.2.4.5, Retrieved from the Internet at http://www.3gpp.org/ftp/Meetings_3GPP_SYNC/RAN1/Docs/, 3 pages.

Interdigital, Inc., "On Efficient UL Beam Management," 3GPP TSG RAN WG1 NR Ad-Hoc#2, R1-1710925, Qingdao, P.R. China, 2017, Agenda Item 5.1.2.2.1, Retrieved from the Internet at http://www.3gpp.org/ftp/Meetings_3GPP_SYNC/RAN1/Docs/, 3 pages.

Communication pursuant to Article 94(3) EPC, directed to European Application No. 18762957.1, dated May 4, 2021, 5 pages.

* cited by examiner 612
614
610
607
605
600

800

CONTROL SIGNALING FOR SOUNDING REFERENCE SIGNAL (SRS)

CLAIM OF PRIORITY

The present application claims priority to PCT International Application Number PCT/CN2017/097167 filed Aug. 11, 2017 and entitled "CONTROL SIGNALING FOR SOUNDING REFERENCE SIGNAL," to PCT International Application Number PCT/CN2017/105239 filed Oct. 3, 2017 and entitled "CONTROL SIGNALING OVERHEAD REDUCTION FOR UPLINK NON-CODEBOOK BASED TRANSMISSION," and to U.S. Provisional Patent Application Ser. No. 62/620,178 filed Jan. 22, 2018 and entitled "CONTROL SIGNALING OVERHEAD REDUCTION FOR UPLINK NON-CODEBOOK BASED TRANSMISSION," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Next-generation wireless cellular communication systems may provide support for higher bandwidths.

Meanwhile, various wireless cellular communication systems may employ Sounding Reference Signals (SRS), which may assist in establishing Uplink (UL) channel quality.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
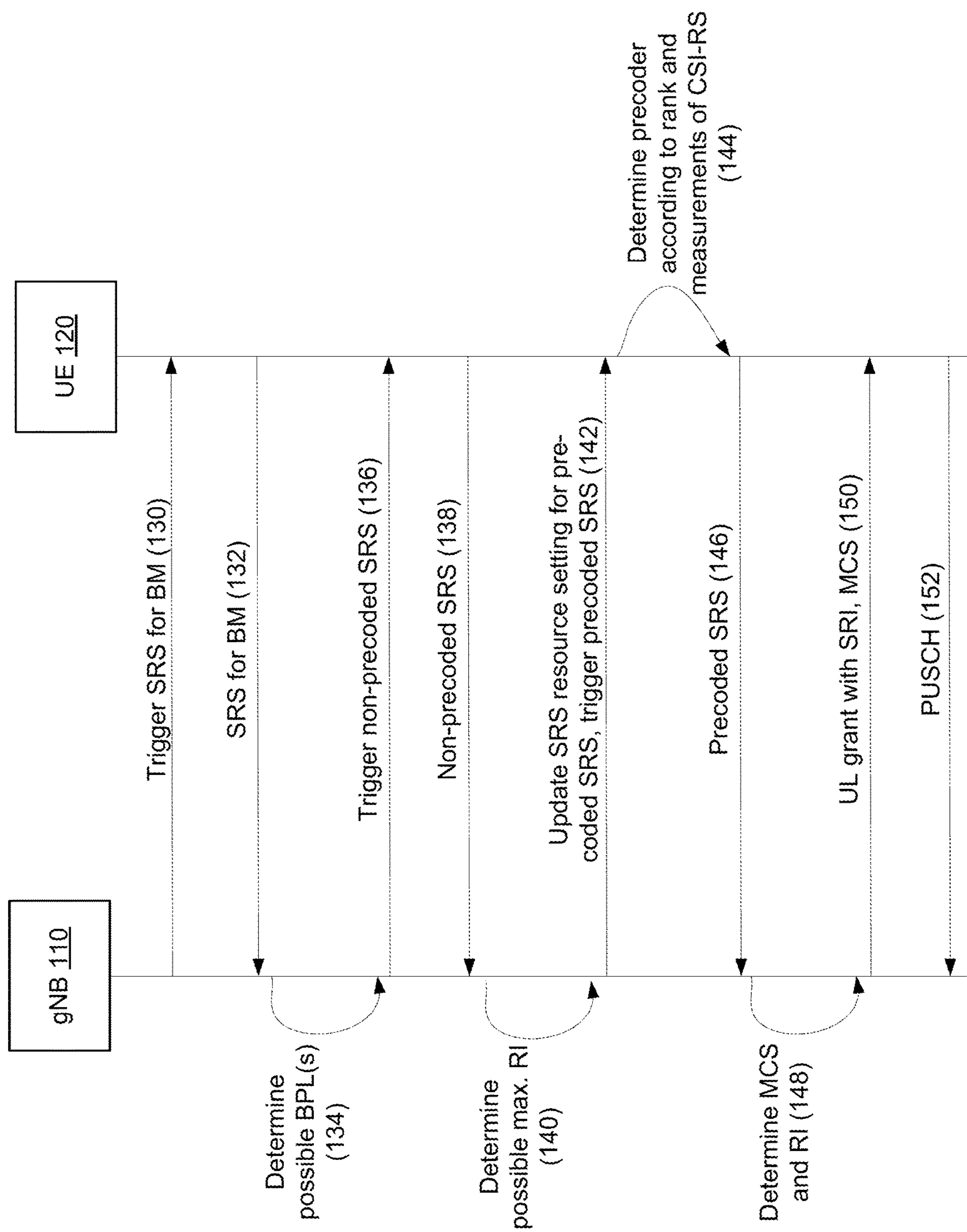
FIG. 1 illustrates an example timing diagram associated with determination of an Uplink (UL) precoder, based on exchange of various types of Sounding Reference Signal (SRS) resource sets between a fifth-generation Evolved Node B (gNB) and a User Equipment (UE), according to some embodiments.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and a 5th Generation wireless system/5th Generation mobile networks (5G) system/5th Generation new radio (NR) system. Some proposed cellular communication systems may incorporate radio frequencies including one or more frequency bands between 30 gigahertz and 300 gigahertz. Corresponding with radio wavelengths from 10 mm to 1 mm, such communication systems may sometimes be referred to as millimeter wave (mmWave) systems.

In a communication system (e.g., a 5G system), larger bandwidth may be used to increase user data rates and system data rates. The mmWave band may be used to provide such wide bandwidth. A larger subcarrier spacing may be used in this wideband system. For example, each subcarrier may take 750 kilohertz (kHz).

In a communication system (e.g., a 5G system), Cyclic Prefix (CP) Orthogonal frequency-division multiplexing (OFDM) based waveform may be used for uplink, e.g., if a User Equipment (UE) is not in a coverage limited scenario. In an example, spatial multiplexing may be used for uplink transmission. Further the UE may be able to calculate the precoder based on some downlink reference signal, such as Channel State Information-Reference Signals (CSI-RS), which is also referred to as non-codebook based transmission.

To support non-codebook based transmission, precoded Sounding Reference Signal (SRS) may be used, where precoders with different ranks may be used in different SRS resources. A gNB may indicate an SRS Resource Indicator (SRI) in the uplink grant. After receiving the SRI, the UE may use the same precoder (e.g., the precoder in corresponding precoded SRS) to transmit Physical Uplink Shared Channel (PUSCH) signals.

However, if the rank of precoder is large, e.g. 8 (or higher), the number of precoded SRS may be 8 (or higher), which may increase the overhead of precoded SRS and the payload size of the SRI. In this example, there may be 8 SRS resources and the SRI may be 3 bits. Furthermore, if there are multiple Beam Pair Links (BPLs), a total number of SRS resources may further increase. Hence, it may be advantageous to reduce signaling overhead for SRS and SRI in uplink grant.

Various embodiments and examples of this disclosure discuss control signaling enhancement for SRS, e.g., to support non-codebook based transmission. For example, various embodiments and examples of this disclosure discuss SRS resource grouping, control signaling for precoded SRS, control signaling for non-precoded SRS, etc.

In a communication system (e.g., a 5G system), uplink transmission may support non-codebook based transmission for CP-OFDM waveform, where the gNB may identify a CSI-RS and the UE may calculate the possible digital precoders for uplink (e.g., based on the downlink estimated channel from the CSI-RS). For example, the uplink precoder may be calculated from Singular Value Decomposition (SVD) of the channel covariance matrix as follows: $USV^H=HH^H$, where the precoder may be obtained from the first k volumes of matrix V with normalization, and k is determined by the rank of the precoder. Assuming n(.) to be the normalization function, the precoder for rank K may be determined by P=[n(V1)/K, n(V2)/K, . . . n(VK)/L], where $V_j$ indicates the column j of matrix V.

The UE may transmit multiple one-port precoded SRS resources, where different columns of V may be applied. Then for rank one transmission, the gNB may identify one SRS resource. For transmission involving higher than one rank, the gNB may identify more than one SRS resources. In an example, as the rank may dynamically change, it may be useful for the control signaling to support the indication of different ranks.

Further, to support subband precoding, the control signaling overhead may increase to indicate the SRS resource for different subbands. In an example, it may be advantageous to reduce the overhead of control signaling to support both wideband and subband non-codebook based precoding.

In an example, it may be advantageous to determine relative timing between SRS and SRI indication. The UE may be able to change the precoder for an SRS resource. Then both the UE and gNB may have the same understanding as to which SRS is identified for a SRI, e.g., to avoid potential Modulation Coding Scheme (MCS) mismatch.

Various embodiments and examples of this disclosure discuss control signaling reduction for uplink non-codebook based transmission, including SRS resources sub-set restriction, dynamic wideband and subband precoding indication, timing of SRS and SRI indication, etc.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In an example, multiple SRS resources may be used for precoded SRS. However, if the rank is very high, the number of SRS resources may be large. For example, if the maximum rank is assumed to be N, a total of N precoded SRS resources may be needed. Further if there are K Beam Pair Links (BPLs) in uplink side, there may be K*N precoded SRS resources, which may increase the overhead of SRS and the payload size of SRI in uplink grant.

FIG. 1 illustrates an example timing diagram associated with determination of an Uplink (UL) precoder, based on exchange of various types of SRS resource sets between a gNB 110 and a UE 120, according to some embodiments. At 130, the gNB 110 may issue a trigger for SRS for Beam Management (BM). The trigger for SRS for BM may be issued through higher level signaling, such as a Radio Resource Control (RRC) message, or through Downlink Control Information (DCI). At 132, the UE 120 may transmit an SRS for BM. In an embodiment, the SRS for BM may be used (e.g., by the gNB 110) to find out possible BPL(s) (e.g., an optimal, near optimal, or best BPL(s)), illustrated as operation 134 in FIG. 1.

At 136, the gNB 110 may issue a trigger for non-precoded SRS. The trigger for non-precoded SRS may be issued through higher level signaling, such as an RRC message, or DCI. At 138, the UE 120 may transmit a non-precoded SRS.

In some embodiments, the non-precoded SRS may be used (e.g., by the gNB 110) to find out the possible maximum rank of precoder (e.g., determine possible maximum Rank Indicator (RI)), illustrated as operation 140 in FIG. 1.

In some embodiments, based at least in part on the possible maximum RI, the gNB 110 may update SRS resource setting for pre-coded SRS, and may issue a trigger for precoded SRS at 142. The trigger for precoded SRS may be issued through higher level signaling, such as an RRC message, or DCI. At 144, the UE 120 may determine the precoder, based at least in part on the maximum possible RI and measurements of CSI-RS. At 146, the UE 120 may transmit a precoded SRS to the gNB 110.

At 148, the gNB may determine MCS and RI, and at 150 the gNB 110 may transmit a UL grant along with SRI and the MCS. At 152, the UE 120 may transmit PUSCH signals, based on the UL grant.

Thus, in FIG. 1, joint non-precoded and precoded SRS resources may be used. As discussed, in a first operation, the possible BPLs may be selected from the SRS for beam management (e.g., at 134); in a second operation, the maximum possible rank of the precoder may be determined based on the non-precoded SRS (e.g., at 140); and in a third operation, the precoded SRS may be used to determine MCS (e.g., at 148). Thus, the use of the SRS for BM and the non-precoded SRS may limit or reduce a number of precoded SRS.

In some embodiments and as discussed with respect to FIG. 1, three SRS resource groups (also referred to as SRS resource sets) may be used: (i) SRS resource group 1: SRS for BM (e.g., which may be used to find out possible BPL(s)), (ii) SRS resource group 2: non-precoded SRS (e.g., which may be used to determine the maximum possible rank), and (iii) SRS resource group 3: precoded SRS (e.g., which is used to determine the precoder, MCS, RI).

In one example, for SRS resource group 1 (e.g., SRS for BM), a maximum number of SRS resource may be equal to ($N_{beam}$*$N_{panel}$), where $N_{beam}$ may indicate a number of transmit (Tx) beams and $N_{panel}$ may denote a number of panels. For SRS resource group 2 (e.g., non-precoded SRS), a number of SRS resources may be equal to $N_{BPL}$, where $N_{BPL}$ may refer to the number of BPLs (e.g., as determined at 134 of FIG. 1). For SRS resource group 3 (e.g., precoded SRS), a number of SRS resources may be equal to ($N_{RI}$*$N_{BPL}$), where $N_{RI}$ may be the maximum possible rank of precoder. In an example, the number of SRS resources in the SRS resource group 3 may be used to determine a payload size of SRI in an uplink grant (e.g., the size of SRI in the UL grant at 150).

In some embodiments, the three SRS resource groups may be defined for individual panels. For example, if $N_{panel}$ is the number of panels, then there may be up to (3*$N_{panel}$) number of SRS resource groups, with individual panels having up to three SRS resource groups.

In some embodiments, two or more SRS resource groups may be combined into one group. Merely as an example, the above discussed SRS resource groups 1 and 2 may be combined into a single SRS resource group. In another example, the above discussed SRS resource groups 2 and 3 may be combined into a single SRS resource group.

In some embodiments, when configuring an SRS resource group, an SRS type indicator (e.g., which may indicate the group number) may be configured by the gNB 110 using higher layer signaling (e.g., RRC message). In one example, the SRS type indicator may comprise two bits. Table 1 below illustrates example values for the SRS type indicator (the values of the SRS type indicator and the corresponding indication in Table 1 are mere examples, and do not limit the scope of this disclosure).

TABLE 1

| SRS type indicator | Indication |
|---|---|
| 00 | SRS for beam management |
| 01 | Non-precoded SRS |
| 10 | Precoded SRS |
| 11 | reserved |

Thus, the triggers at operations 130, 136, and 142 of FIG. 1 may include the SRS type indicator (also referred to as SRS request field). For example, the SRS type indicator for the trigger 130 may have a value of 00, to indicate that the trigger is for SRS resource group for BM. The SRS type indicator for the trigger 136 may have a value of 01, to indicate that the trigger is for non-precoded SRS resource group. The SRS type indicator for the trigger 142 may have a value of 10, to indicate that the trigger is for precoded SRS resource group. Thus, a specific value of the SRS type indicator (also referred to as SRS request field) triggers a specific type of SRS resource group.

In some embodiments, an active SRS group index may be used to indicate whether a current transmission scheme is codebook based transmission, or non-codebook based transmission scheme. For example, if the active SRS group index is for non-precoded SRS, then the codebook based transmission scheme may be assumed. If the active SRS group index is for precoded SRS, then non-codebook based transmission scheme may be assumed. In an example, the active SRS group index may be configured by higher layer signaling or DCI. The active SRS group index may be panel specific (e.g., individual panel may have a corresponding active SRS group index), or may be common for more than one panel (e.g., common for all panels). In an example, the payload size of SRI may be determined by the active SRS group index.

Figure 2:
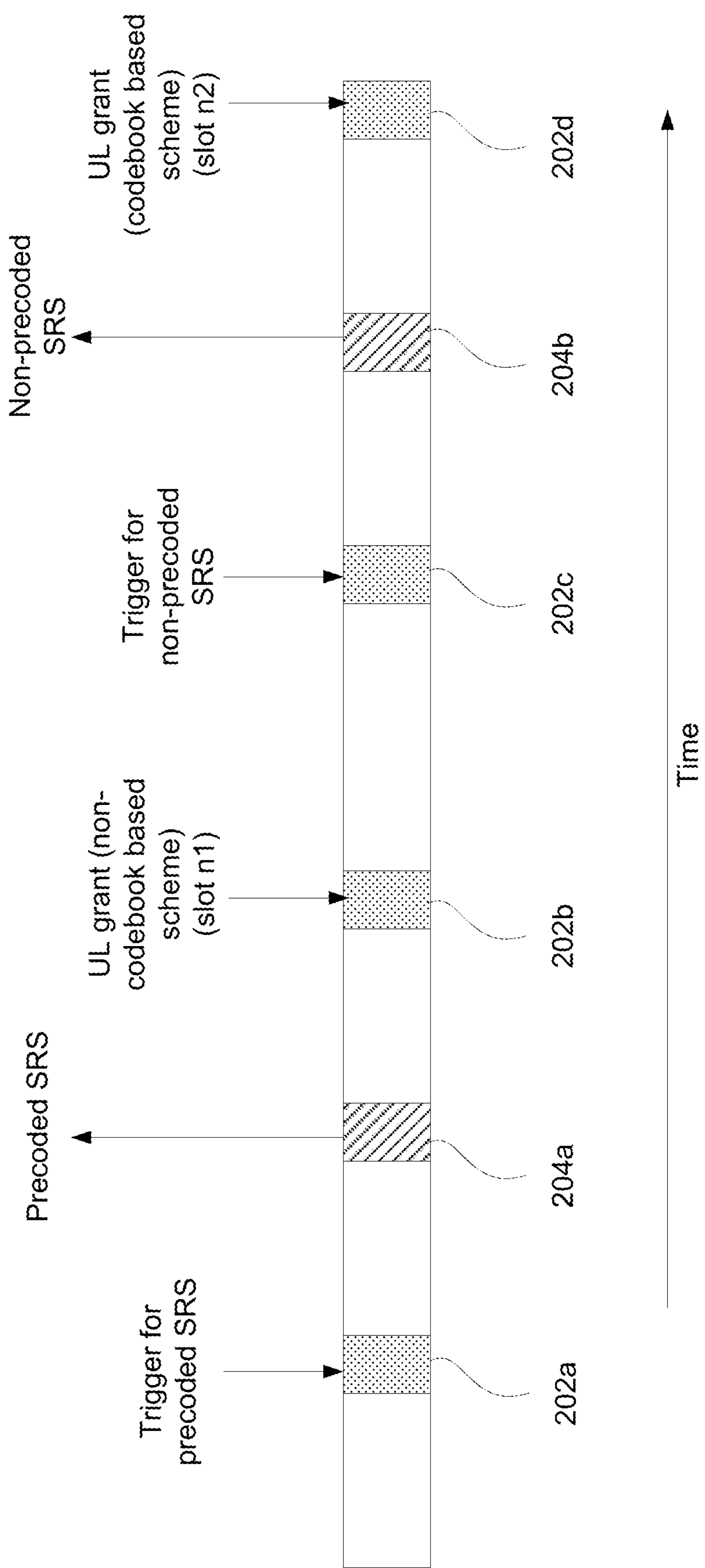
FIG. 2 illustrates a transmission scheme switching between various SRS resource groups, according to some embodiments.

FIG. 2 illustrates a transmission scheme switching between various SRS resource groups, according to some embodiments. FIG. 2 illustrates various transmission slots, such as UL transmission slots 204*a*, 204*b*, and Downlink (DL) transmission slots 202*a*, 202*b*, 202*c*, and 202*d*. The transmission slots progress from 202*a*, 204*a*, 202*b*, and so on, with time, as illustrated in the figure.

In some embodiments, when triggering the SRS transmission, the SRS group index (e.g., which may be the SRS type indicator of Table 1 in an example) may be indicated by the higher layer signaling or DCI. In this case, the UE (e.g., UE 120) may select corresponding types of SRS to transmit.

For example, at 202*a*, the gNB 110 triggers for precoded SRS. The gNB 110 may use an SRS group index, such as the SRS type indicator of Table 1 or another appropriate SRS index, to indicate that the trigger is for precoded SRS. Based on identifying the trigger to be for precoded SRS, the UE 120 may transmit precoded SRS at 204*a*. The gNB 110 may provide UL grant at 202*b*.

The transmission scheme for the UL grant at 202*b* may be based on SRS group index of the latest successfully transmitted SRS. For the UL grant at 202*b*, the latest successfully transmitted SRS is at 204*a*, and the corresponding group index (which was included in the trigger at 202*a*) indicates that the latest successfully transmitted SRS is for precoded SRS. Accordingly, the UL grant may indicate a non-codebook based transmission scheme.

At 202*c*, the gNB 110 triggers for non-precoded SRS. The gNB 110 may use an SRS group index, such as the SRS type indicator of Table 1 or another appropriate SRS index, to indicate that the trigger is for non-precoded SRS. Based on identifying the trigger to be for non-precoded SRS, the UE 120 may transmit non-precoded SRS at 204*b*. The gNB 110 may provide UL grant at 202*d*.

The transmission scheme for the UL grant at 202*d* may be based on SRS group index of the latest successfully transmitted SRS. For the UL grant at 202*d*, the latest successfully transmitted SRS is at 204*b*, and the corresponding group index (which was included in the trigger at 202*c*) indicates that the latest successfully transmitted SRS is for non-precoded SRS. Accordingly, the UL grant may indicate a codebook-based transmission scheme.

Thus, the transmission scheme indicated in a UL grant may be determined by SRS group index of the latest successfully transmitted SRS, as discussed with respect to FIG. 2.

As discussed with respect to FIG. 1, the UL grants at 202*b* and 202*d* may include corresponding SRIs. Assume that the UL grant at 202*b* be at slot n1, and the UL grant at 202*d* be at slot n2. Thus, at slot n1, the corresponding SRI is associated with the most recent transmission of the SRS resource identified by the SRI (e.g., SRS resource of 204*a*). Similarly, at slot n2, the corresponding SRI is associated with the most recent transmission of the SRS resource identified by the SRI (e.g., SRS resource of 204*b*).

In some embodiments, the SRS resource for non-precoded SRS and the SRS resource for precoded SRS may be generated within an SRS resource group. When triggering the SRS, the UE may indicate the number of application protocols (APs) of SRS. In an example, the gNB 110 may indicate whether the SRS is precoded SRS or non-precoded SRS. In an example, if the number of APs is equal to a maximum number of APs of SRS, the gNB 110 may indicate whether the SRS is precoded SRS or non-precoded SRS.

In uplink grant, if the SRI is for non-precoded SRS, then codebook based transmission scheme may be assumed. On the other hand, if the SRI is for precoded SRS, then non-codebook based transmission scheme may be assumed.

In some embodiments, the SRI, transmission PMI (TPMI), and/or transmission Rank Indicator (TRI) may be jointly coded. In an example, in the uplink grant, information associated with the SRS resource and precoder may be indicated. For example, an "indicator of SRS resource and precoder information" may be provided in the uplink grant. A payload size of this indicator may be determined by the number of SRS resources. Table 2 illustrates example values for the indicator of SRS resource and precoder information, and corresponding indication. In an example, Table 2 may be applicable for a two-antenna port scenario. The values of the indicator and the corresponding indication in Table 2 are mere examples, and do not limit the scope of this disclosure. Table 2 is an example for indication of SRS resource and precoder information.

TABLE 2

| Indicator of SRS resource and precoder information | Indication |
|---|---|
| 0 | SRI = 0, TRI = 0, TPMI = 0, codebook based transmission scheme |
| 1 | SRI = 0, TRI = 0, TPMI = 1, codebook based transmission scheme |
| 2 | SRI = 0, TRI = 0, TPMI = 2, codebook based transmission scheme |
| 3 | SRI = 0, TRI = 0, TPMI = 3, codebook based transmission scheme |
| 4 | SRI = 0, TRI = 1, TPMI = 0, codebook based transmission scheme |
| 5 | SRI = 0, TRI = 1, TPMI = 1, codebook based transmission scheme |
| 6 | SRI = 1, non-codebook based transmission scheme, precoder is the same as SRS resource 1 |
| 7 | SRI = 2, non-codebook based transmission scheme, precoder is the same as SRS resource 2 |

The indicator of Table 2 may be transmitted by the gNB 110 to the UE 120 via UL grant. For example, a value of 0 of the indicator may indicate an SRI of 0, TRI of 0, TPMI of 0, and codebook based transmission scheme. Other rows of the table are self-explanatory.

Figure 3A:
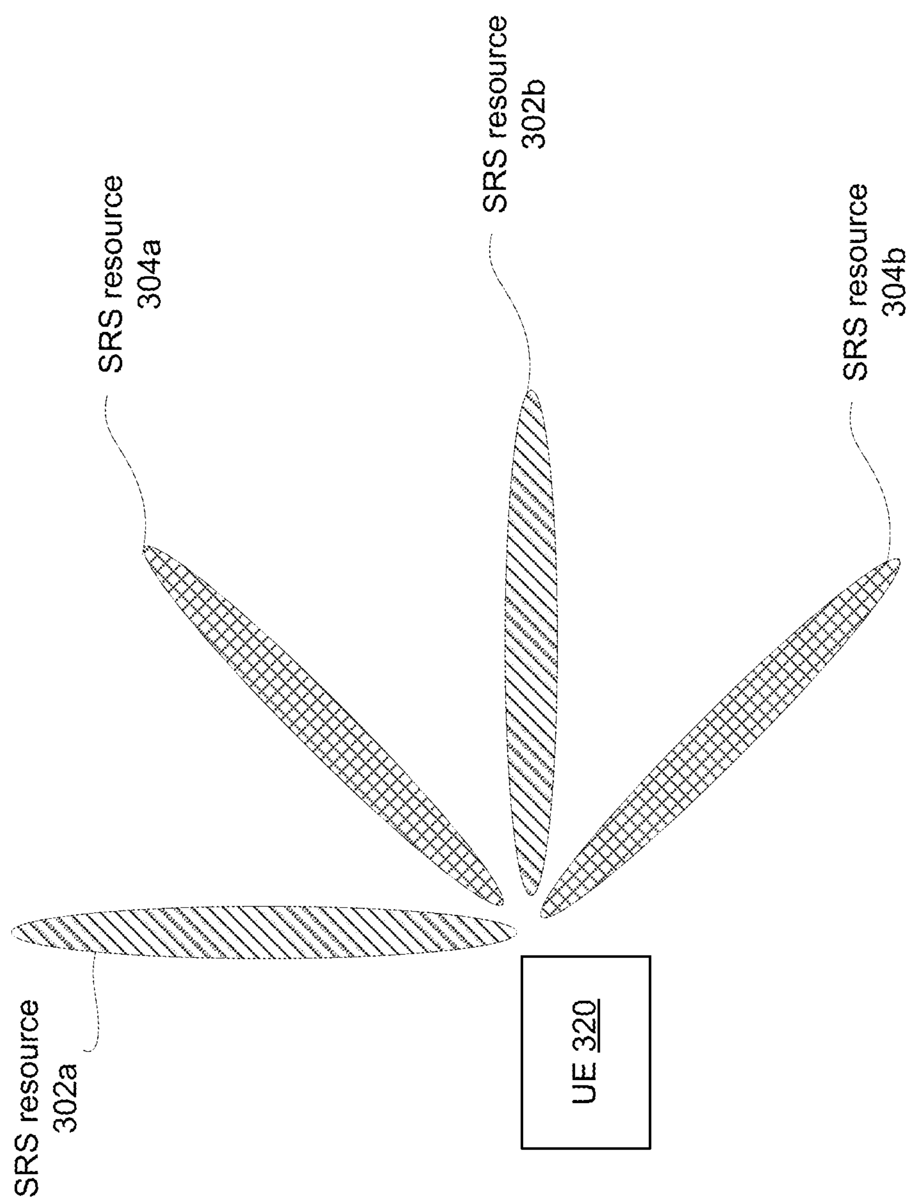
FIG. 3A illustrates an example UE and examples of precoded SRS resources, where first and second SRS resources are orthogonal, and third and fourth SRS resources are orthogonal, according to some embodiments.

In an example, a UE may apply different rank 1 precoders in different SRS resources (e.g., apply a first rank 1 precoder for first SRS resource, apply a first rank 2 precoder for second SRS resource, etc.). However, some rank 1 precoders may not be idle or appropriate for high rank transmission. FIG. 3A illustrates an example UE 320 and examples of precoded SRS resources, where SRS resources 302*a* and 302*b* are orthogonal, and SRS resource 304*a* and 304*b* are orthogonal, according to some embodiments. In an example, there may be some restrictions for high rank transmission.

In some embodiments, some type of scheduling may be performed for multiple possible SRS resources for high rank transmission by gNB. However, there may be some restriction for such cases. In this case, to define an SRS resource sub-set restriction for high rank transmission may result in reduction of control signaling overhead.

In some embodiments, an SRS resource sub-set restriction may be configured by higher layer signaling, DCI, and/or predefined (e.g., predefined in the specification). The possible SRS resources for different ranks may be defined. Table 3 illustrates an example SRS resource sub-set restriction, e.g., when the maximum rank is, for example, 4. For example, Table 3 depicts an example for all possible SRS resource sub-sets, when the maximum rank is, for example, 4.

TABLE 3

| SRS resource sub-set index | Indication |
|---|---|
| 0 | SRS resource 1 |
| 1 | SRS resource 1 and 2 |
| 2 | SRS resource 1, 2, and 3 |
| 3 | SRS resource 1, 2, 3 and 4 |

The SRS resource sub-set index of Table 3 may be transmitted from a gNB to a UE (e.g., UE 320). The SRS resource sub-set index of 0 may indicate usage of SRS resource 1; the SRS resource sub-set index of 1 may indicate usage of SRS resources 1 and 2, and so on. In an example, in the UL grant for non-codebook based transmission, the possible SRS Resource Indices (SRI(s)) may be derived from possible SRS resource sub-sets.

Table 4 herein below example values of an "aperiodic SRS triggering field," which determines when SRS transmission is triggered, and also identifies a set of SRS resources that are to be configured by higher layer signaling. An association between an SRS resource sub-set, SRS resource set and/or SRS resource group may be configured by higher layers. Upon decoding an UL grant that has the "aperiodic SRS triggering field" set to a specific value, SRS transmissions on the associated set of SRS resource subsets or sets or groups and/or component carriers (CCs) are triggered subject to the detected value.

TABLE 4

| Value of aperiodic SRS triggering field in UL grant | Description |
|---|---|
| 00 | No SRS transmission is triggered |
| 01 | SRS is triggered for a 1$^{st}$ set of SRS resource subset/set/group and/or {SRS resource subset, CCs set} configured by higher layers. |
| 10 | SRS is triggered for a 2$^{nd}$ set of SRS resource subset/set/group and/or {SRS resource subset, CCs set} configured by higher layers. |
| 11 | SRS is triggered for a 3$^{rd}$ set of SRS resource subset/set/group and/or {SRS resource subset, CCs set} configured by higher layers. |

Thus, for example, a value of 00 for the aperiodic SRS triggering field (which may be present in the UL grant) may indicate that no SRS transmission is triggered. A value of 01 for the aperiodic SRS triggering field may indicate that SRS is triggered for a first set of SRS resource subset, SRS resource set, SRS resource group, and/or {SRS resource subset, CCs set} and is configured by higher layers, and so on.

In an example, a UE (e.g., UE 310) may apply different precoders in different Precoding Resource Block Group (PRG), e.g., to achieve some frequency selective precoding gain (e.g., a first precoder may be used for a first PRG, a second precoder may be used for a second PRG, and so on). In such an example, the subband SRI(s) may increase the signaling overhead of DCI.

In some embodiments, the subband SRI(s) and wideband SRI(s) may be jointly encoded, e.g., to support dynamic wideband and subband precoding switching. For example, if the SRI(s) for each of multiple subbands are the same, the wideband precoding may be assumed to be similar to the subband SRI(s). The number of subbands may be predefined, or may be configured by higher layer signaling, or may depend on capabilities of the UE. Table 5 illustrates an example of multiple subband SRI(s) indications, e.g., when a maximum rank is 2 and/or when a number of subband size is 2 (although such a specific number of maximum rank and/or a specific number of subband sizes are merely examples). Table 5 is an example for subband SRI(s) indication when maximum rank is 2.

TABLE 5

| SRI(s) in DCI | SRI(s) for subband 1 | SRI(s) for subband 2 |
|---|---|---|
| 0 | SRS resource 1 | SRS resource 1 |
| 1 | SRS resource 2 | SRS resource 2 |
| 2 | SRS resource 1 | SRS resource 2 |
| 3 | SRS resource 2 | SRS resource 1 |
| 4 | SRS resource 1 and 2 | SRS resource 1 and 2 |
| 5 | SRS resource 3 and 4 | SRS resource 3 and 4 |
| 6 | SRS resource 1 and 2 | SRS resource 3 and 4 |
| 7 | SRS resource 3 and 4 | SRS resource 1 and 2 |

For example, the first row of Table 5 corresponds to a case in which SRS resource 1 is used for subbands 1 and 2; the second row of the table corresponds to a case in which SRS resource 2 is used for subbands 1 and 2; the last row of the table corresponds to a case in which SRS resources 3 and 4 are used for subband 1, and SRS resources 1 and 2 are used for subband 2; and so on.

In some embodiments, the uplink grant and subband SRI(s) may be indicated in a two-stage DCI mode. The UE may decode the uplink grant first, and may determine the size of another DCI with subband SRI(s). Then the indication of subband SRI(s) may rely on the rank from wideband SRI(s). If the DCI for subband SRI(s) fails, the UE may fallback to wideband transmission with wideband SRI(s).

In an example, in the first stage of the two-stage DCI, whether the second stage DCI for subband precoding exists may be indicated explicitly by an indicator, or may be implicitly indicated by the search space or CRC sequence. Also, a common or independent SRS resource sub-set may be defined for both wideband and subband SRI(s). In an example, the size of subband SRI(s) may be explicitly indicated in the first stage DCI of the two-stage DCIs. In an example, in a case where the size of subband SRI(s) is 0, it may indicate that merely wideband transmission with wideband SRI(s) is applied for UL transmission.

In another embodiment, the subband SRI(s) may be transmitted by MAC Control Element (CE). For example, assume k is the slot for MAC CE transmission or the ACK of MAC CE transmission, and x is the offset slot with regard to some decoding latency (e.g., where the offset slot may be predefined or configured by higher layer signaling). Then, the UE may use (k+x) slots for the subband SRI(s) for uplink transmission.

Figure 3B:
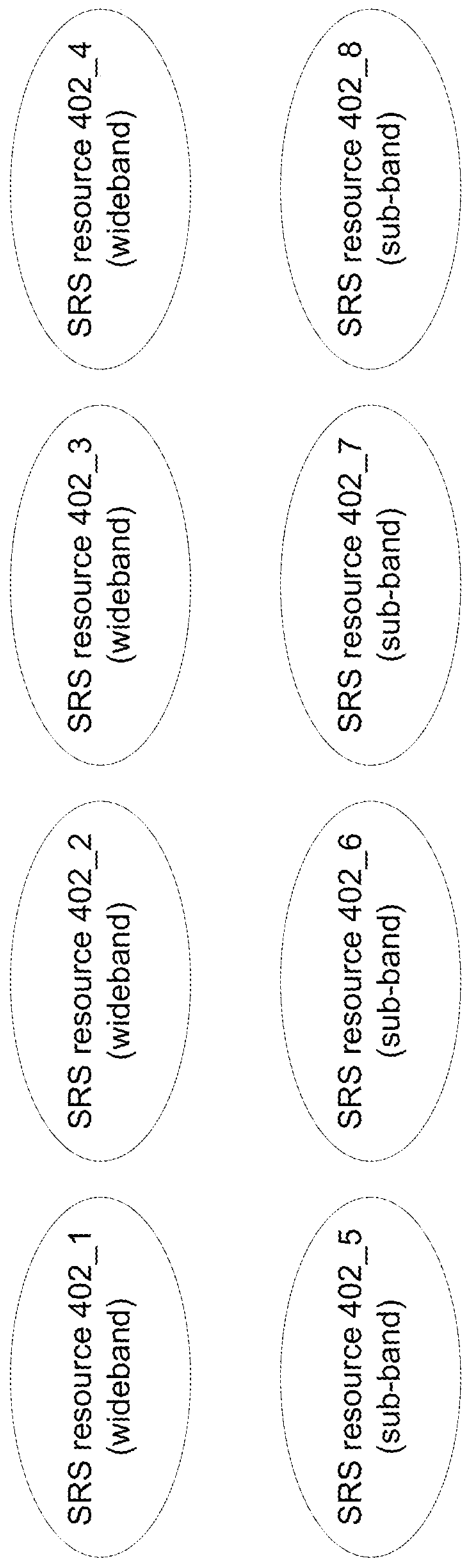
FIG. 3B illustrates an example SRS resource configuration, according to some embodiments.

In some embodiments, when configuring the SRS resources, the gNB may identify the SRS resources for wideband precoding and also identify the SRS resources for subband precoding (e.g., may specify whether an individual SRS resource is for wideband precoding or subband precoding). The UE may apply the subband precoder for the SRS resource with subband precoding. Then the wideband and subband precoding may be switched by higher layer signaling or by an indication of SRI(s). FIG. 3B illustrates an example SRS resource configuration, according to some embodiments. For example, in FIG. 3B, SRS resources 402_1, 402_2, 402_3 and 402_4 may be used for wideband precoding, and SRS resources 402_5, 402_6, 402_7 and 402_8 may be used for sideband precoding.

In an example, if a UE has transmission power limitation (e.g., which may make it difficult or not possible to transmit the SRS in large bandwidth), one SRS resource may be transmitted in multiple consecutive or non-consecutive symbols (e.g., along with frequency hopping). In such an example, different precoders may be applied in different PRGs.

As discussed with respect to FIG. 3B, a UE may support both wideband and subband precoding, and may perform dynamic switching between wideband precoding and subband precoding. In an example, whether a specific UE can support such dynamic wideband and subband precoding switching may depend on UE capability.

If dynamic switching is supported by the UE, the gNB may apply some SRS resource sub-set restriction, as shown in Table 6. The table shows possible SRS resource sub-set for a scenario where the maximum rank is 4.

TABLE 6

| SRS resource sub-set index | Transmission operation | Indication |
|---|---|---|
| 0 | Wideband precoding | SRS resource 1 |
| 1 | Wideband precoding | SRS resource 1 and 2 |
| 2 | Wideband precoding | SRS resource 1, 2, and 3 |
| 3 | Wideband precoding | SRS resource 1, 2, 3 and 4 |
| 4 | Subband precoding | SRS resource 5 |
| 5 | Subband precoding | SRS resource 5 and 6 |
| 6 | Subband precoding | SRS resource 5, 6, and 7 |
| 7 | Subband precoding | SRS resource 5, 6, 7 and 8 |

For example, table 6 defines an SRS resource sub-set index. A value of 0 for the index may indicate wideband precoding transmission scheme, as indicated by SRS resource 1; a value of 7 for the index may indicate subband precoding transmission scheme, as indicated by SRS resources 5, 6, 7, and 8; and so on. In some embodiments where the UE supports dynamic switching between sideband and wideband precoding, the resource sub-set index may be changed to cause the switching.

In some embodiments, to support subband precoding, the SRS resource may be configured with multiple symbols, and frequency hopping may be applied to each symbol. In such an example, different precoders may be applied to different symbols. Whether different precoders can be applied to different symbols with the same or different bandwidth may be (i) predefined, (ii) configured by higher layer signaling, and/or (iii) determined by the bandwidth, precoder resource block group (PRG) size, and/or a number of antenna ports. Merely as an example, different precoders for different symbols may be applied when a number of antenna ports is equal to or more than 4, and/or the bandwidth for different symbols belong to different PRGs.

In one example, for the SRS resource with the multiple symbols without frequency hopping, the same precoder may be applied for the multiple symbols. In another example, for the SRS resource with frequency hopping, different precoders may be applied in different symbols if, for example, the bandwidth belongs to different PRGs and if subband precoding is enabled. If the bandwidth includes multiple PRGs, one precoder may be applied for one specific PRG.

In an example, the UE may apply different precoders for an SRS resource in different timing instance. Then different MCS may be derived from different timing instance. To avoid such the potential MCS mismatch due to precoder change, the timing of SRS and SRI may be identified (e.g., an SRI has to match or be associated with a specific corresponding SRS, and not in random SRS), as discussed with respect to FIG. 3C.

Figure 3C:
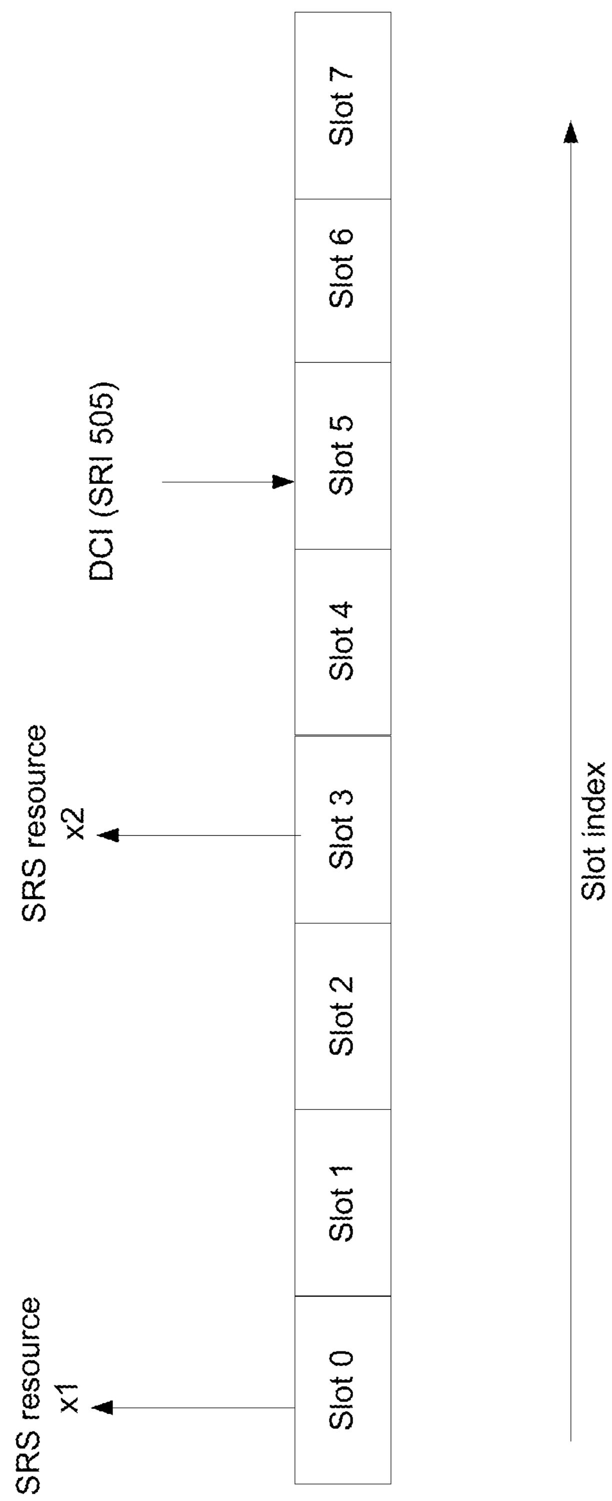
FIG. 3C illustrates a timing relationship between SRS resources and SRO that is received over higher level signaling, according to some embodiments.

FIG. 3C illustrates a timing relationship between SRS resources and SRI that is received over higher level signaling (e.g., DCI), according to some embodiments. FIG. 3C illustrates UL and DL transmission during various transmission slots 0, . . . , 7. For example, during slot 0, SRS resource x1 is transmitted from the UE to the gNB; and during slot 3, SRS resource x2 is transmitted from the UE to the gNB. In slot 5, the UE receives an UL grant, which includes DCI, where the DCI includes an SRI 505 (the slot numbers are merely examples). Without any pre-defined arrangement, the UE may not know whether the SRI 505 corresponds to the SRS resource x1 or SRS resource x2.

In an embodiment, the SRI in slot k may be used to indicate the latest SRS in corresponding resource before slot (k−k1), where k1 may be pre-defined, may be configured by higher layer signaling or DCI, and/or may be determined by the slot index of next PUSCH transmission.

In the example of FIG. 3C, if k1>2, the SRI 505 may be associated with SRS resource x1 transmitted in slot 0. If k1 is 0, 1, or 2, the SRI 505 may be associated with SRS resource x2 transmitted in slot 3.

As discussed, k1 may be pre-defined. In an example, k1=0. In such a case, if multiple SRS resources (e.g., a sequence of SRS resources) are transmitted by the UE to the gNB and the UE receives a UL grant with a DCI comprising an SRI, the SRI may be associated with the most recent transmitted SRS that is identified by the SRI.

In an example, for wide band operations, the UE and the gNB may support bandwidth parts (BWPs). A BWP may be UE specific, and may be equal to or smaller than a maximal bandwidth capability supported by a UE. A BWP may span at least part of a bandwidth of a wireless communication channel between a UE and a gNB. In some embodiments, if cross carrier or cross bandwidth part (BWP) Quasi-Co-Location (QCL) is assumed, the SRS resource may be indicated by cross carrier or cross BWP. When configuring the SRS resource, a carrier index and/or BWP index may be configured (e.g., by the gNB). Alternatively (or additionally), the SRS resource in different BWP or carrier may be configured within different SRS resource groups. The corresponding SRS resource group index may be indicated by the carrier or BWP index in the DCI.

Figure 4:
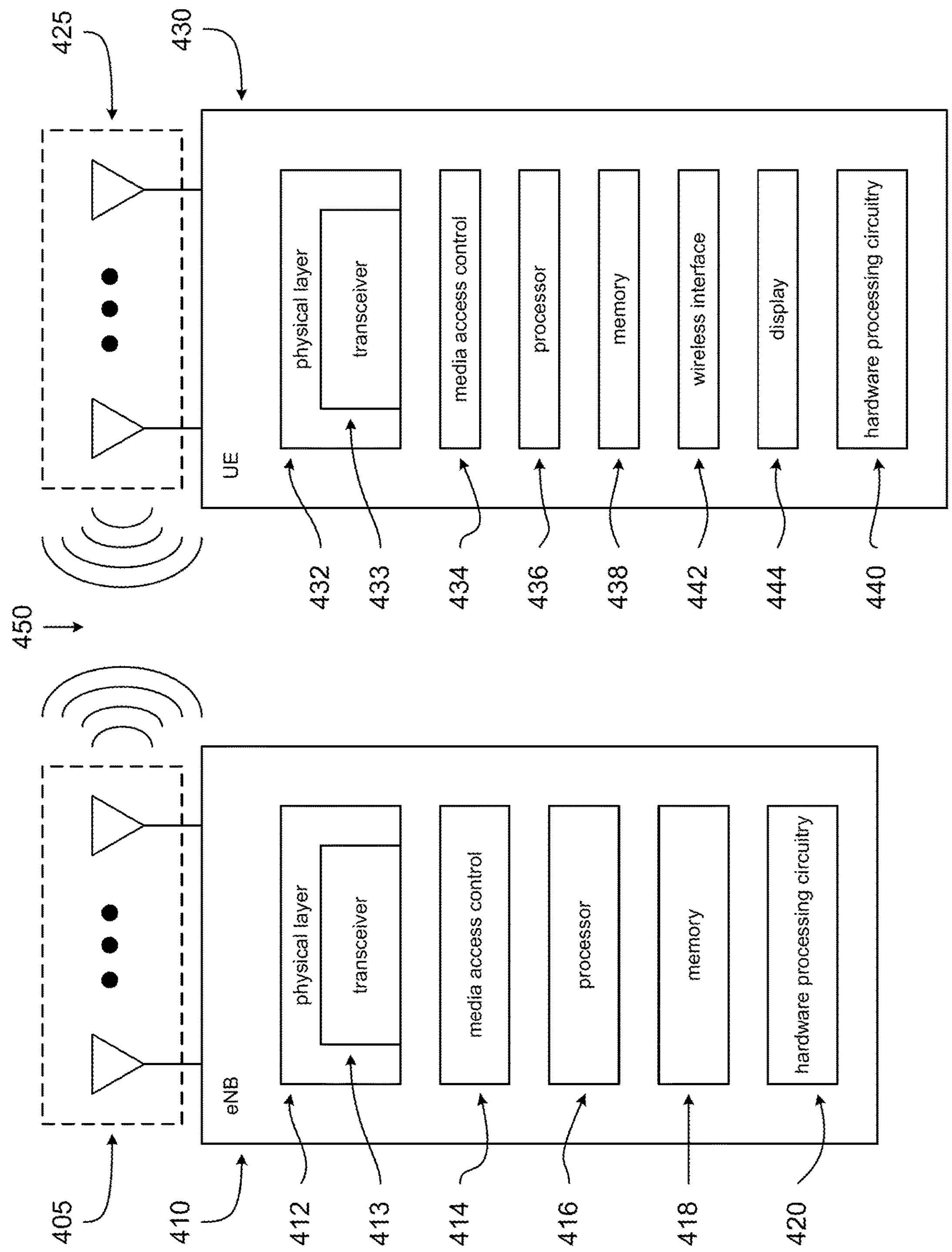
FIG. 4 illustrates an Evolved Node-B (eNB) and a UE, in accordance with some embodiments of the disclosure.

FIG. 4 illustrates an eNB and a UE, according to some embodiments. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 5:
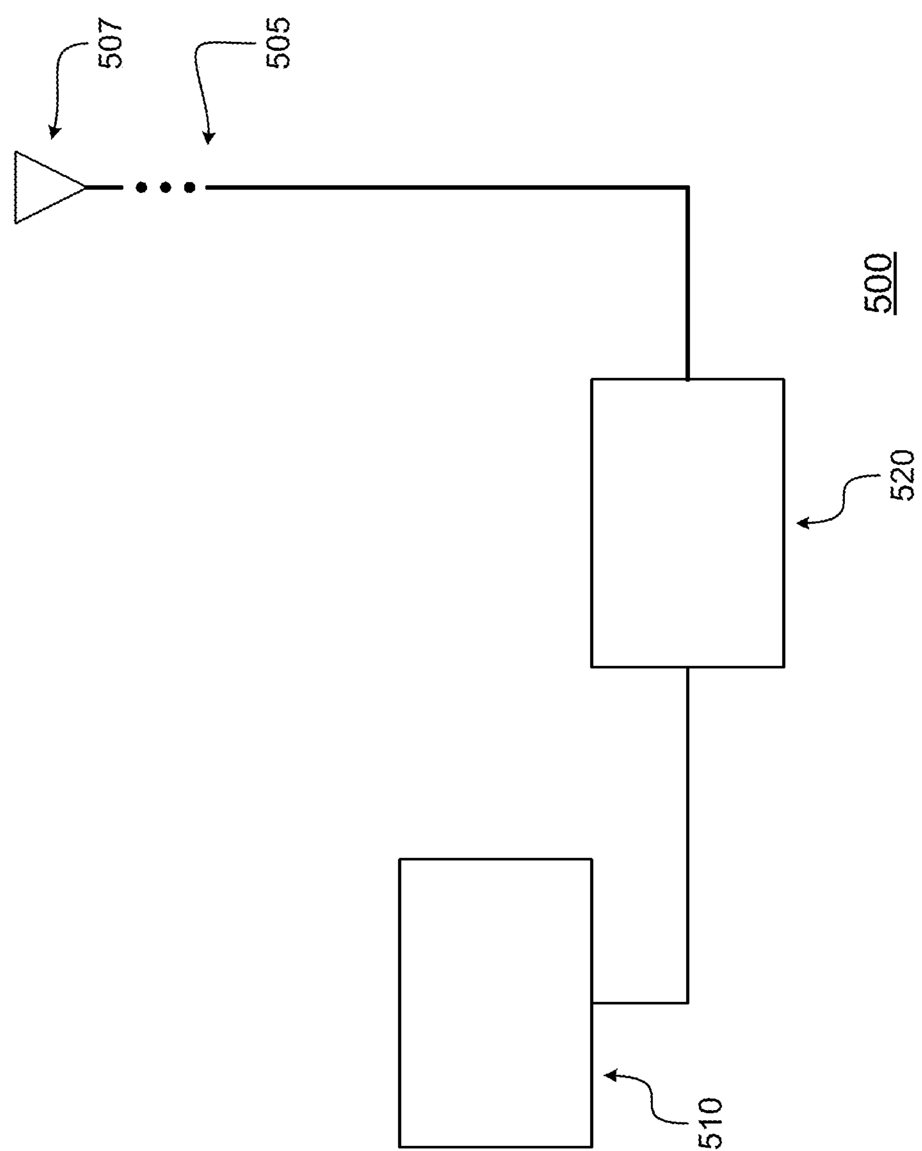
FIG. 5 illustrates hardware processing circuitries for an eNB for establishing an indicator to indicate a type of SRS resource set to be transmitted by the UE, and transmitting the indicator to the UE, according to some embodiments.

FIG. 5 illustrates hardware processing circuitries 500 for an eNB for establishing an indicator to indicate a type of SRS resource set to be transmitted by the UE (e.g., as discussed with respect to Tables 1, 3, 4, and/or 6), and transmitting the indicator to the UE, according to some embodiments. With reference to FIG. 4, an eNB may include various hardware processing circuitries discussed herein (such as hardware processing circuitry 500 of FIG. 5), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 5, an apparatus of eNB 410 (or another eNB or base station), which may be operable to communicate with one or more UEs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 405). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from an eNB to a wireless communications channel and/or a UE, and may be operable to provide signals from a UE and/or a wireless communications channel to an eNB. For example, antenna ports 505 and antennas 507 may be operable to provide transmissions from eNB 410 to wireless communication channel 450 (and from there to UE 430, or to another UE). Similarly, antennas 507 and antenna ports 505 may be operable to provide transmissions from a wireless communication channel 450 (and beyond that, from UE 430, or another UE) to eNB 410.

Hardware processing circuitry 500 may comprise various circuitries operable in accordance with the various embodiments discussed herein. With reference to FIG. 5, hardware processing circuitry 500 may comprise a first circuitry 510 and/or a second circuitry 520.

In various embodiments, first circuitry 510 may be operable to establish an indicator to indicate a type of Sounding Reference Signal (SRS) resource set to be transmitted by the UE (e.g., as discussed with respect to Tables 1, 3, 4, and/or 6). Second circuitry 520 may be operable to generate a message including the indicator, e.g., for transmission to a UE. The UE may, in response to receiving such a message with the indicator, transmit a SRS resource set of the specific type. In some embodiments, the indicator of the SRS resource set type is to indicate one of: SRS resource set type for non-codebook based transmission, SRS resource set type for codebook based transmission, or SRS resource set type for Beam Management.

In some embodiments, the indicator is a first indicator, and the first circuitry 510 may be operable to generate a sequence of indicators. The sequence of indicators may include the first indicator that is to indicate SRS resource set type for Beam Management; the sequence of indicators may include a second indicator that is to indicate SRS resource set type for codebook based transmission; and the sequence of indicators may include a third indicator that is to indicate SRS resource set type for non-codebook based transmission.

In some embodiments, first circuitry 510 and/or second circuitry 520 may be implemented as separate circuitries. In other embodiments, first circuitry 510 and second circuitry 520 may be combined and implemented together in a circuitry without altering the essence of the embodiments.

Figure 6:
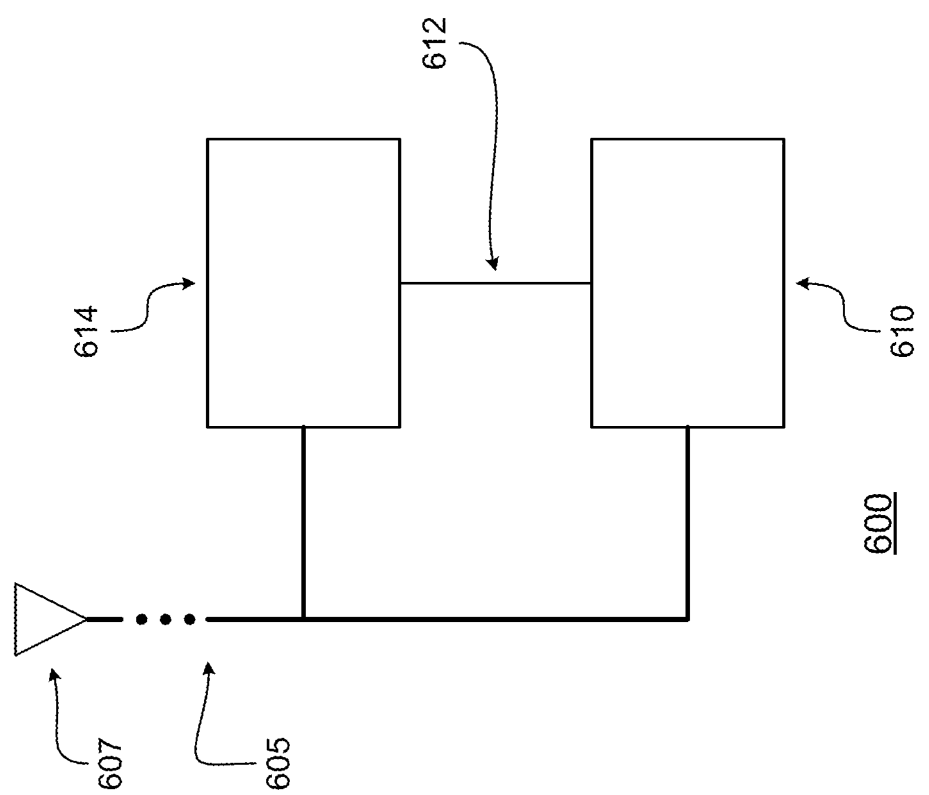
FIG. 6 illustrates hardware processing circuitries for a UE for generating SRS transmission, based on processing an indicator that indicates an SRS resource type, according to some embodiments.

FIG. 6 illustrates hardware processing circuitries for a UE for generating SRS transmission, based on processing an indicator that indicates an SRS resource type, according to some embodiments. With reference to FIG. 4, a UE may include various hardware processing circuitries discussed herein (such as hardware processing circuitry 600 of FIG. 6), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 6, an apparatus of UE 430 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 425). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 430 to wireless communication channel 450 (and from there to eNB 410, or to another eNB). Similarly, antennas 607 and antenna ports 605 may be operable to provide transmissions from a wireless communication channel 450 (and beyond that, from eNB 410, or another eNB) to UE 430.

Hardware processing circuitry 600 may comprise various circuitries operable in accordance with the various embodiments discussed herein. With reference to FIG. 6, hardware processing circuitry 600 may comprise a first circuitry 610 and/or a second circuitry 620.

First circuitry 610 may be operable to process a message that includes an indicator of SRS resource set type, e.g., as discussed with respect to Tables 1, 3, 4, and/or 6). Second circuitry 620 may be operable to generate an SRS transmission, based on the indicator of the SRS resource set type.

In some embodiments, the indicator is a 2-bit indicator. In some embodiments, the indicator of the SRS resource set type is to indicate one of: non-precoded SRS resource set type, or precoded SRS resource set type. In some embodiments, the indicator of the SRS resource set type is to indicate one of: SRS resource set type for non-codebook based transmission, SRS resource set type for codebook based transmission, or SRS resource set type for Beam Management.

In some embodiments, the SRS transmission is a first SRS transmission that is of SRS resource set type for Beam Management. The first circuitry 610 may be operable to generate a sequence of SRS transmissions, wherein the sequence of SRS transmissions includes the first SRS transmission; a second SRS transmission of the sequence of SRS transmissions is of SRS resource set type for codebook based transmission; and a third SRS transmission of the sequence of SRS transmissions is of SRS resource set type for non-codebook based transmission.

In some embodiments, the message is a first message, and the first circuitry 610 may be operable to process a second message that includes the indicator of SRS resource set type, wherein the indicator of the second message is to indicate that no SRS resource set transmission is to be triggered. In some embodiments, the first circuitry 610 may be operable to refrain from generating any SRS transmission, in response to processing the second message.

In some embodiments, the SRS transmission is a first SRS transmission, and the first circuitry 610 may be operable to generate a sequence of SRS transmissions for transmission to the eNB, the sequence of SRS transmissions includes the first SRS transmission; the first circuitry 610 may be operable to the one or more processors are to process an Uplink Grant (UL) that includes an SRS Resource Indicator (SRI), wherein the SRI is associated with a most recent SRS transmission of the sequence of SRS transmissions prior to receiving the SRI.

In some embodiments, the SRS transmission is a first SRS transmission. In some embodiments, the first circuitry 610 may be operable to generate a sequence of SRS transmissions, the sequence of SRS transmissions includes the first SRS transmission for transmission to an eNB. The first circuitry 610 may be operable to process an UL grant that includes an SRS Resource Indicator (SRI), wherein the SRI is received at the UE at slot n, and wherein the SRI at slot n is associated with a most recent SRS transmission of the sequence of SRS transmissions prior to slot n.

In an example, the indicator is a first indicator, and wherein the first circuitry 610 may be operable to process the message that includes a second indicator of a Bandwidth Part (BWP) spanning at least part of a bandwidth of a wireless communication channel between the UE and the gNB, wherein the SRS resource set type, as indicated by the first indicator, is for the BWP.

In some embodiments, first circuitry 610 and/or second circuitry 620 may be implemented as separate circuitries. In other embodiments, first circuitry 610 and/or second circuitry 620 may be combined and implemented together in a circuitry without altering the essence of the embodiments.

Figure 7:
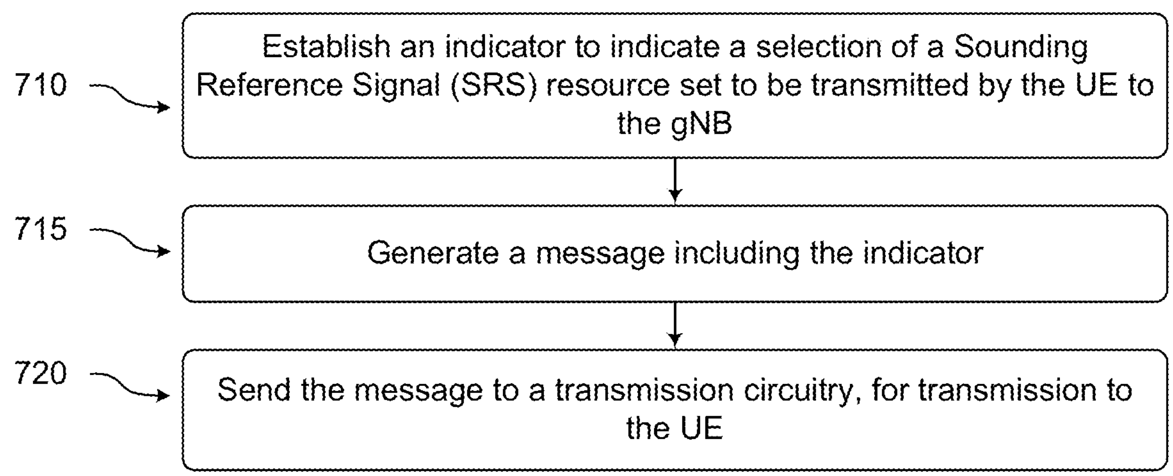
FIG. 7 illustrates a method for an eNB for establishing an indicator to indicate a type of SRS resource set to be transmitted by the UE, and transmitting the indicator to the UE, according to some embodiments.

FIG. 7 illustrates a method 700 for an eNB for establishing an indicator to indicate a type of SRS resource set to be transmitted by the UE (e.g., as discussed with respect to Tables 1, 3, 4, and/or 6), and transmitting the indicator to the UE, according to some embodiments. With reference to FIG. 4, various methods that may relate to eNB 410 and hardware processing circuitry 420 are discussed herein. Although the actions in method 700 of FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 410 and/or hardware processing circuitry 420 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, the method 700 may be in accordance with the various embodiments discussed herein. The method 700 comprises, at 710, establishing an indicator to indicate a selection of a Sounding Reference Signal (SRS) resource set to be transmitted by the UE to the gNB (e.g., as discussed with respect to Tables 1, 3, 4, and/or 6). At 715, a message (e.g., higher level signaling, DCI, etc.) including the indicator may be generated. At 720, an interface may send the message to a transmission circuitry, for transmission to a UE.

In some embodiments, the indicator has one of: a first value indicating a selection of a first SRS resource set, a second value indicating a selection of a second SRS resource set, or a third value indicating a selection of a third SRS resource set. In an example, at least one of the first, second, or third SRS resource sets is associated with one of: SRS for non-codebook based transmission, SRS for codebook based transmission, or SRS for Beam Management.

In some embodiments, the indicator is a first indicator; the one or more circuitries are to generate a sequence of indicators including the first indicator, a second indicator, and a third indicator; the first indicator is to indicate a selection of a first SRS resource set for Beam Management; the second indicator is to indicate a selection of a second SRS resource set for codebook based transmission; and the third indicator is to indicate a selection of a third SRS resource set for non-codebook based transmission.

Figure 8:
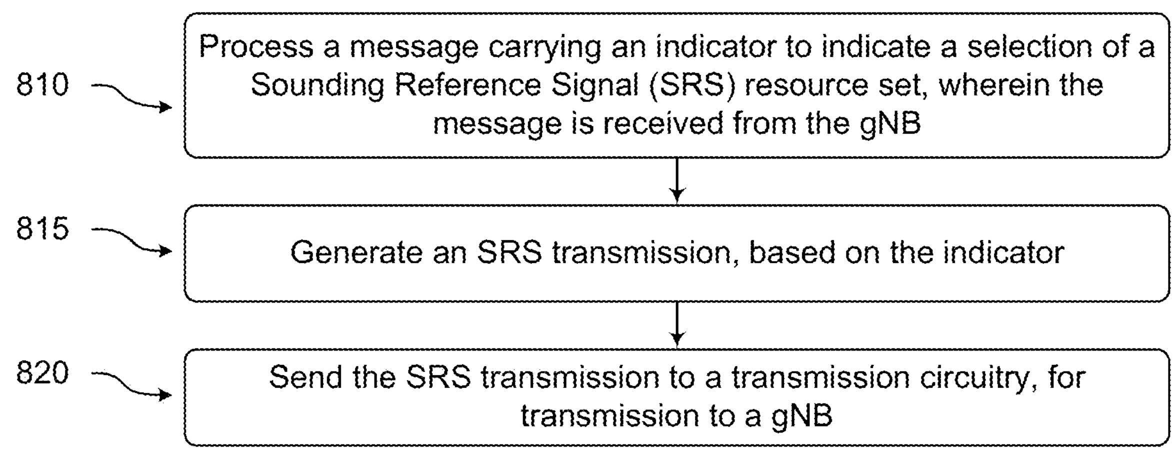
FIG. 8 illustrates a method for a UE for generating SRS transmission, based on processing an indicator that indicates an SRS resource type, according to some embodiments.

FIG. 8 illustrates a method 800 for a UE for generating SRS transmission, based on processing an indicator that indicates an SRS resource type, according to some embodiments. With reference to FIG. 4, the method 800 that may relate to UE 430 and hardware processing circuitry 440 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, the method 800 may be in accordance with the various embodiments discussed herein. The method 800 may comprise, at 810, a processing of a message carrying an indicator to indicate a selection of a Sounding Reference Signal (SRS) resource set (e.g., as discussed with respect to Table 4), where the message is received from the gNB. At 815, an SRS transmission may be generated, based on the indicator of the SRS resource set. At 820, the SRS transmission may be sent to a transmission circuitry, e.g., for transmission to a gNB.

In some embodiments, the indicator is a 2-bit indicator. In some embodiments, the indicator has one of: a first value indicating a selection of a first SRS resource set, a second value indicating a selection of a second SRS resource set, or a third value indicating a selection of a third SRS resource set. In some embodiments, one or more of the first, second, or third SRS resource sets are configured with higher layer parameters. In some embodiments, the first SRS resource set is associated with one of: SRS for non-codebook based transmission, SRS for codebook based transmission, or SRS for Beam Management.

In some embodiments, the message is a first message, and the method comprises processing a second message carrying an indicator to indicate that no SRS resource set transmission is to be triggered, wherein the second message is received from the gNB. In some embodiments, the method comprises refraining from generating a SRS transmission, in response to the second message. In some embodiments, the SRS transmission is a first SRS transmission; and the method comprises generating a sequence of SRS transmissions including the first SRS transmission; sending the sequence of SRS transmissions to the transmission circuitry; and processing an Uplink (UL) grant that includes an SRS Resource Indicator (SRI), wherein the SRI is associated with a most recent SRS transmission of the sequence of SRS transmissions prior to receiving the SRI.

In some embodiments, the SRS transmission is a first SRS transmission; and the method comprises generating a sequence of SRS transmissions including the first SRS transmission; sending the sequence of SRS transmissions to the transmission circuitry; and processing an Uplink (UL) grant that includes an SRS Resource indicator (SRI), wherein the SRI is received at the UE at a slot n, and wherein the SRI at the slot n is associated with a most recent SRS transmission of the sequence of SRS transmissions that is transmitted prior to the slot n.

In some embodiments, the message includes an indicator of a Bandwidth Part (BWP) spanning at least part of a bandwidth of a wireless communication channel between the UE and the gNB, wherein the indicator indicating the selection of the SRS resource set is for the BWP.

Figure 9:
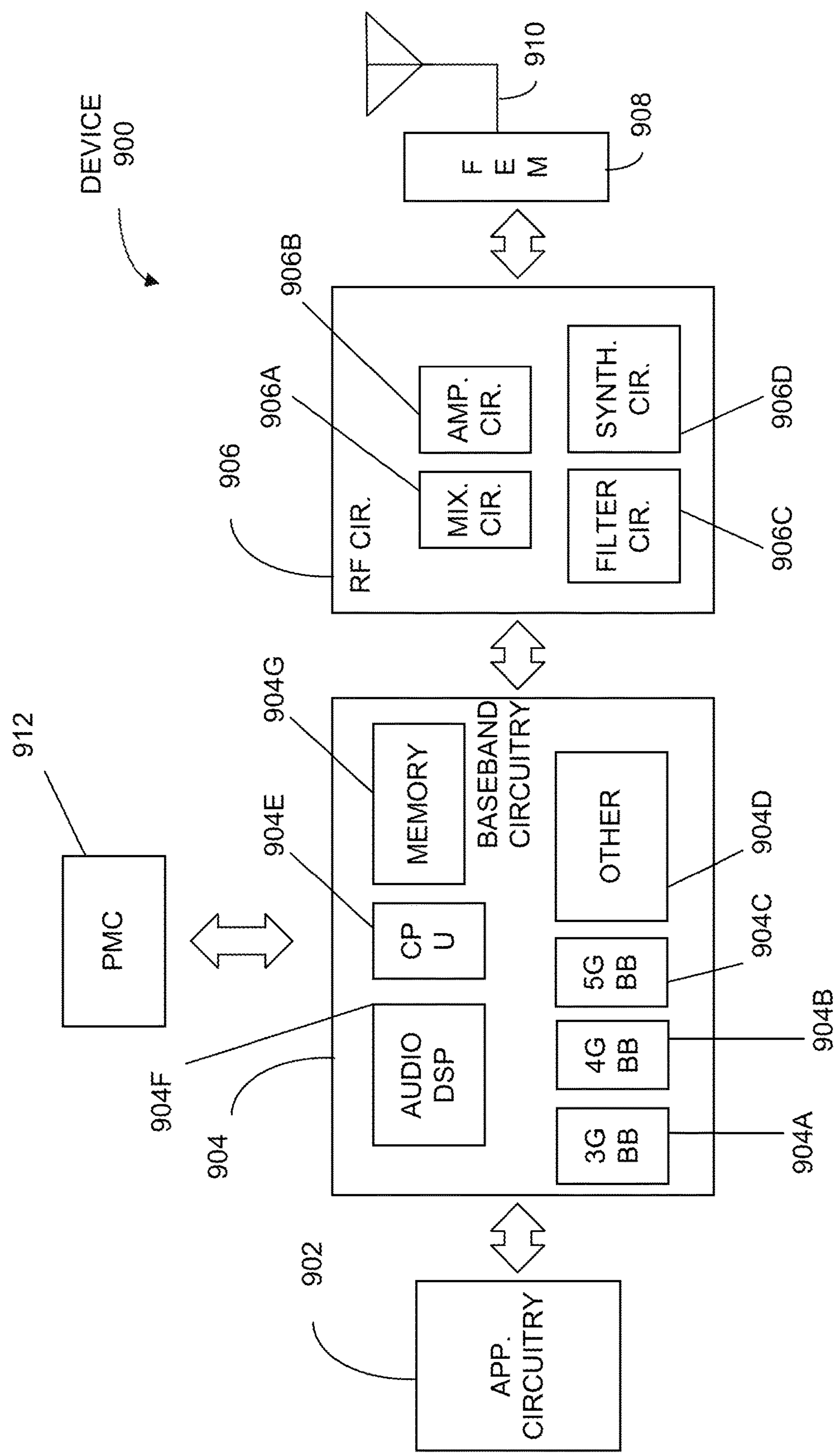
FIG. 9 illustrates example components of a device, according to some embodiments.

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
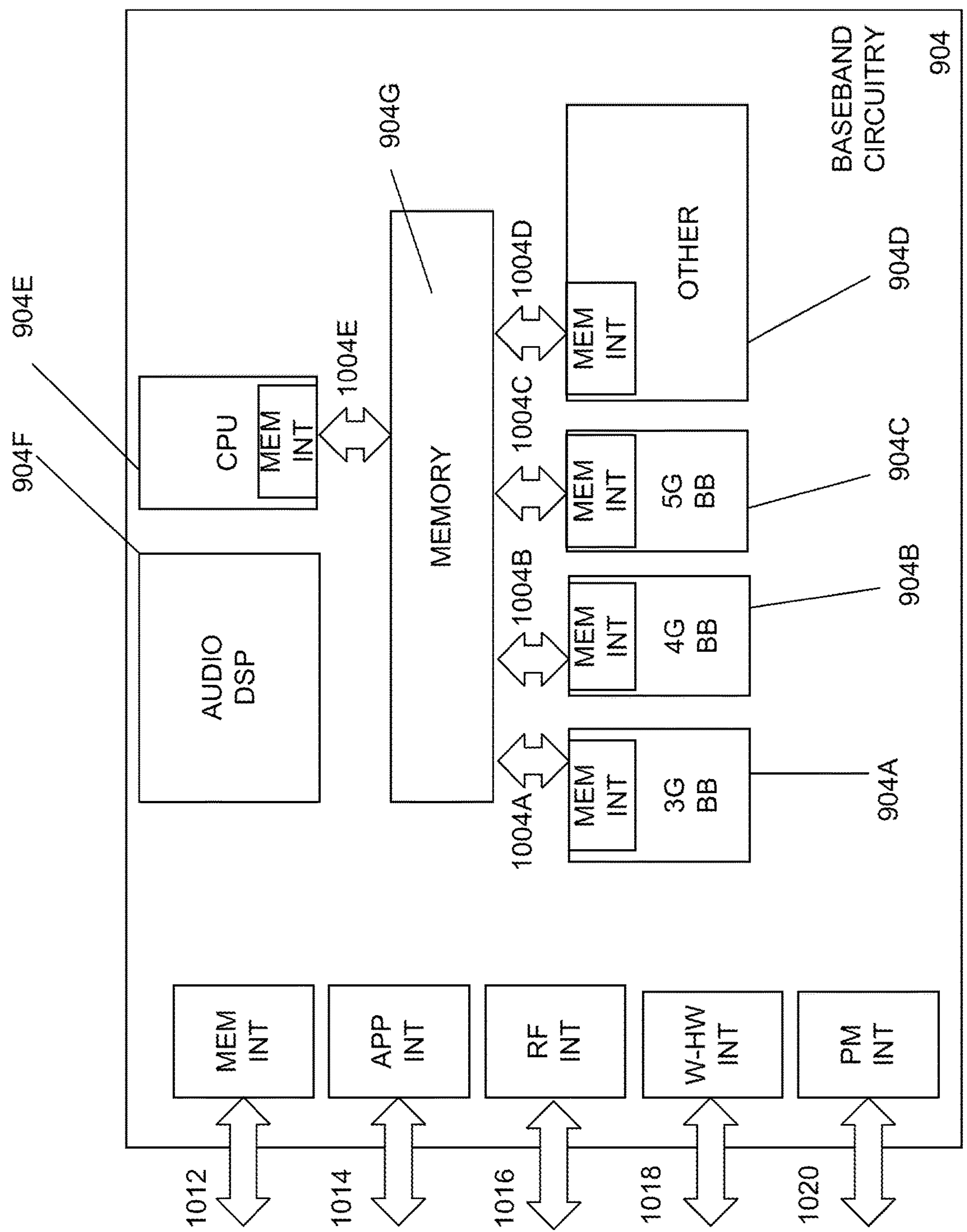
FIG. 10 illustrates example interfaces of baseband circuitry, according to some embodiments.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus of a User Equipment (UE) operable to communicate with a fifth-generation Evolved Node B (gNB) on a wireless network, comprising: one or more circuitries to: process a message carrying an indicator to indicate a selection of a Sounding Reference Signal (SRS) resource set, wherein the message is received from the gNB, and generate an SRS transmission based on the indicator; and an interface to send the SRS transmission to a transmission circuitry.

Example 2

The apparatus of example 1 or any other examples herein, wherein: the indicator is a 2-bit indicator.

Example 3

The apparatus of example 1 or any other examples herein, wherein: the indicator has one of: a first value indicating a selection of a first SRS resource set, a second value indicating a selection of a second SRS resource set, or a third value indicating a selection of a third SRS resource set.

Example 4

The apparatus of example 3 or any other examples herein, wherein: one or more of the first, second, or third SRS resource sets are configured with higher layer parameters.

Example 5

The apparatus of example 3 or any other examples herein, wherein: the first SRS resource set is associated with one of: SRS for non-codebook based transmission, SRS for codebook based transmission, or SRS for Beam Management.

Example 6

The apparatus of any of examples 1-5 or any other examples herein, wherein the message is a first message, and the one or more circuitries are to: process a second message carrying an indicator to indicate that no SRS resource set transmission is to be triggered, wherein the second message is received from the gNB.

Example 7

The apparatus of example 6 or any other examples herein, wherein the one or more circuitries are to: refrain from generating a SRS transmission, in response to the second message.

Example 8

The apparatus of any of examples 1-5 or any other examples herein, wherein: the SRS transmission is a first SRS transmission; the one or more circuitries are to generate a sequence of SRS transmissions including the first SRS transmission; the interface is to send the sequence of SRS transmissions to the transmission circuitry; and the one or more circuitries are to process an Uplink (UL) grant that includes an SRS Resource Indicator (SRI), wherein the SRI is associated with a most recent SRS transmission of the sequence of SRS transmissions prior to receiving the SRI.

Example 9

The apparatus of any of examples 1-5 or any other examples herein, wherein: the SRS transmission is a first SRS transmission; the one or more circuitries are to generate a sequence of SRS transmissions including the first SRS transmission; the interface is to send the sequence of SRS transmissions to the transmission circuitry; and the one or more circuitries are to process an Uplink (UL) grant that includes an SRS Resource indicator (SRI), wherein the SRI is received at the UE at a slot n, and wherein the SRI at the slot n is associated with a most recent SRS transmission of the sequence of SRS transmissions that is transmitted prior to the slot n.

Example 10

The apparatus of any of examples 1-5 or any other examples herein, wherein: the message includes an indicator of a Bandwidth Part (BWP) spanning at least part of a bandwidth of a wireless communication channel between the UE and the gNB, wherein the indicator indicating the selection of the SRS resource set is for the BWP.

Example 11

A User Equipment (UE) device comprising an application processor, a memory, one or more antennas, a wireless interface for allowing the application processor to communicate with another device, and a touch-screen display, the UE device including the apparatus of any of examples 1-6 or any other examples herein.

Example 12

Machine readable storage media having machine executable instructions that, when executed, cause one or more processors of a User Equipment (UE) operable to communicate with a fifth-generation Evolved Node B (gNB) on a wireless network to perform an operation comprising: process a message carrying an indicator to indicate a selection of a Sounding Reference Signal (SRS) resource set, wherein the message is received from the gNB, and generate an SRS transmission based on the indicator; and send the SRS transmission to a transmission circuitry, for transmission to the gNB.

Example 13

The machine readable storage media of example 12 or any other examples herein, wherein: the indicator is a 2-bit indicator.

Example 14

The machine readable storage media of example 12 or any other examples herein, wherein: the indicator has one of: a first value indicating a selection of a first SRS resource set, a second value indicating a selection of a second SRS resource set, or a third value indicating a selection of a third SRS resource set.

Example 15

The machine readable storage media of example 14 or any other examples herein, wherein: one or more of the first, second, or third SRS resource sets are configured with higher layer parameters.

Example 16

The machine readable storage media of example 14 or any other examples herein, wherein: the first SRS resource set is associated with one of: SRS for non-codebook based transmission, SRS for codebook based transmission, or SRS for Beam Management.

Example 17

The machine readable storage media of example 12 or any other examples herein, wherein the message is a first message, and the operation comprises: process a second message carrying an indicator to indicate that no SRS resource set transmission is to be triggered, wherein the second message is received from the gNB.

Example 18

The machine readable storage media of example 17 or any other examples herein, wherein the operation comprises: refrain from generating a SRS transmission, in response to the second message.

Example 19

The machine readable storage media of any of examples 12-16 or any other examples herein, wherein the SRS transmission is a first SRS transmission, and the operation comprises: generate a sequence of SRS transmissions including the first SRS transmission; send the sequence of SRS transmissions to the transmission circuitry; and process an Uplink (UL) grant that includes an SRS Resource Indicator (SRI), wherein the SRI is associated with a most recent SRS transmission of the sequence of SRS transmissions prior to receiving the SRI.

Example 20

The machine readable storage media of any of examples 12-16 or any other examples herein, wherein the SRS transmission is a first SRS transmission, and the operation comprises: generate a sequence of SRS transmissions including the first SRS transmission; send the sequence of SRS transmissions to the transmission circuitry for transmission to a gNB; and process an Uplink (UL) grant that includes an SRS Resource indicator (SRI), wherein the SRI is received at the UE at a slot n, and wherein the SRI at the slot n is associated with a most recent SRS transmission of the sequence of SRS transmissions that is transmitted prior to the slot n.

Example 21

The machine readable storage media of any of examples 12-16 or any other examples herein, wherein: the message includes an indicator of a Bandwidth Part (BWP) spanning at least part of a bandwidth of a wireless communication channel between the UE and the gNB, wherein the indicator indicating the selection of the SRS resource set is for the BWP.

Example 22

An apparatus of a fifth-generation Evolved Node-B (gNB) operable to communicate with a User Equipment (UE) on a wireless network, comprising: one or more circuitries to: establish an indicator to indicate a selection of a Sounding Reference Signal (SRS) resource set to be transmitted by the UE to the gNB, and generate a message including the indicator; an interface to send the message to a transmission circuitry, for transmission to the UE.

Example 23

The apparatus of example 22 or any other examples herein, wherein: the indicator has one of: a first value indicating a selection of a first SRS resource set, a second value indicating a selection of a second SRS resource set, or a third value indicating a selection of a third SRS resource set, wherein at least one of the first, second, or third SRS resource sets is associated with one of: SRS for non-codebook based transmission, SRS for codebook based transmission, or SRS for Beam Management.

Example 24

The apparatus of any of examples 22-23 or any other examples herein, wherein: the indicator is a first indicator; the one or more circuitries are to generate a sequence of indicators including the first indicator, a second indicator, and a third indicator; the first indicator is to indicate a selection of a first SRS resource set for Beam Management; the second indicator is to indicate a selection of a second SRS resource set for codebook based transmission; and the third indicator is to indicate a selection of a third SRS resource set for non-codebook based transmission.

Example 25

An Evolved Node B (eNB) device comprising an application processor, a memory, one or more antenna ports, and an interface for allowing the application processor to communicate with another device, the eNB device including the apparatus of any of examples 22-24 or any other examples herein.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) configured to communicate with a base station on a wireless network, the UE comprising:

one or more circuitries to:

process a message received from the base station carrying an indicator to indicate a selection of a Sounding Reference Signal (SRS) resource set, wherein the indicator indicates the SRS resource set is associated with a non-codebook based transmission or a codebook based transmission; and generate an SRS transmission based on the indicator; and an interface to send the SRS transmission to a transmission circuitry.

2. The UE of claim 1, wherein the indicator is a 2-bit indicator.

3. The UE of claim 1, wherein the indicator has one of: a first value indicating a selection of a first SRS resource set or a second value indicating a selection of a second SRS resource set.

4. The UE of claim 3, wherein one or more of the first or second SRS resource sets are configured with higher layer parameters.

5. The UE of claim 3, wherein the first SRS resource set is associated with one of: SRS for the non-codebook based transmission or SRS for the codebook band transmission.

6. The UE of claim 1, wherein the message is a first message, and the one or more circuitries are further configured to:

process a second message received from the base station and carrying a second indicator to indicate that no SRS resource set transmission is to be triggered.

7. The UE of claim 6, wherein the one or more circuitries are further configured to:

refrain from generating the SRS transmission, in response to the second message.

8. The UE of claim 1, wherein:

the SRS transmission is a first SRS transmission, the one or more circuitries are configured to generate a sequence of SRS transmissions including the first SRS transmission, the interface is configured to send the sequence of SRS transmissions to the transmission circuitry, and the one or more circuitries are further configured to process an Uplink (UL) grant that includes an SRS Resource Indicator (SRI), wherein the SRI is associated with a most recant SRS transmission of the sequence of SRS transmissions prior to receiving the SRI.

9. The UE of claim 1, wherein:

the SRS transmission is a first SRS transmission, the one or more circuitries are configured to generate a sequence of SRS transmissions including the first SRS transmission, the interface is configured to send the sequence of SRS transmissions to the transmission circuitry, the one or more circuitries are further configured to process an Uplink (UL) grant that Includes an SRS Resource indicator (SRI), the SRI is received at the UE at a slot n, and the SRI at the slot n is associated with a most recent SRS transmission of the sequence of SRS transmissions that is transmitted prior to the slot n.

10. The UE of claim 1, wherein:

the message includes an indicator of a Bandwidth Part (BWP) spanning at least part of a bandwidth of a wireless communication channel between the UE and the base station, and the indicator indicates the selection of the SRS resource set is for the BWP.

11. The UE of claim 1, wherein the one or more circuitries are further configured to process a second message comprising a second indicator having one of: a first value indicating a selection of a first SRS resource sat associated with SRS for the non-codebook based transmission, a second value indicating a selection of a second SRS resource set associated with SRS for the codebook based transmission, or a third value indicating a selection of a third SRS resource set associated with SRS for Beam Management.

12. Non-transitory machine readable storage media having machine executable instructions that, when executed, cause one or more processors of a User Equipment (UE) configured to communicate with a base station on a wireless network to perform operations comprising:

processing a message received from the base station carrying an indicator to indicate a selection of a Sounding Reference Signal (SRS) resource set, wherein the indicator indicates the SRS resource set is associated with a non-codebook based transmission or a codebook based transmission;

generating an SRS transmission based on the indicator; and sending the SRS transmission to a transmission circuitry, or transmission to the base station.

13. The non-transitory machine readable storage media of claim 12, wherein the indicator is a 2-bit indicator.

14. The non-transitory machine readable storage media of claim 12, wherein the indicator has one of: a first value indicating a selection of a first SRS resource set a second value indicating a selection of a second SRS resource set.

15. The non-transitory machine readable storage media of claim 14, wherein one or more of the first or second SRS resource sets are configured with higher layer parameters.

16. The non-transitory machine readable storage media of claim 14, wherein the first SRS resource set is associated with one of: SRS for the non-codebook based transmission or SRS for the codebook based transmission.

17. The non-transitory machine readable storage media of claim 12, wherein the message is a first message, and the operations further comprise:

processing a second message carrying an indicator to indicate that no SRS resource set transmission is to be triggered, wherein the second message is received from the ha station; and refraining from generating an SRS transmission, in response to the second message.

18. The non-transitory machine readable storage media of claim 12, wherein the operations further comprise:

processing a second message comprising a second indicator having one or a first value indicating a selection of a first SRS resource set associated with SRS for the non-codebook based transmission, a second value indicating a selection of a second SRS resource set associated with SRS for the codebook based transmission, or a third value indicating a selection of a third SRS resource set associated with SRS for Beam Management.

19. The non-transitory machine readable storage media of claim 12, wherein the SRS transmission is a first SRS transmission, and the operations further comprise:

generating a sequence of SRS transmissions including the first SRS transmission;

sending the sequence of SRS transmissions to the transmission circuitry; and processing an Uplink (UL) grant that includes an SRS Resource Indicator (SRI), wherein the SRI is associated with a most recent SRS transmission of the sequence of SRS transmissions prior to receiving the SRI.

20. The non-transitory machine readable storage media of claim 12, wherein the SRS transmission is a first SRS transmission, and the operations further comprise:

generating a sequence of SRS transmissions including the first SRS transmission;

sending the sequence of SRS transmissions to the transmission circuitry for transmission to the base station; and processing an Uplink (UL) grant that includes an SRS Resource indicator (SRI), wherein the SRI is received at the UE at a slat n, and wherein the SRI at the slot n is associated with a most recent SRS transmission of the sequence of SRS transmissions that is transmitted prior to the slot n.

21. The non-transitory machine readable storage media claim 12, wherein the message includes an indicator of a Bandwidth Part (BWP) spanning at least part of a bandwidth of a wireless communication channel between the UE and the base station and wherein the indicator indicates the selection of the SRS resource set is for the BWP.

22. A base station configured to communicate with a User Equipment (UE) on a wireless network, the base station comprising:

one or more circuitries to:

establish an indicator to indicate a selection of a Sounding Reference Signal (SRS) resource set to be transmitted by the UE to the base station; and generate a message including the indicator, wherein the indicator indicates the SRS resource set is associated with a non-codebook based transmission or a codebook based transmission; and an interface to send the message to a transmission circuitry, for transmission to the UE.

23. The base station apparatus of claim 22, wherein:

the indicator has one of: a first value indicating a selection of a first SRS resource set associated with SRS for the non-codebook based transmission or a second value indicating a selection of a second SRS resource set associated with SRS for the codebook based transmission.

24. The base station of claim 22, wherein:

the indicator is a first indicator, the one or more circuitries are configured to generate a sequence of indicators including the first indicator, a second indicator, and a third indicator, the first indicator is to indicate a selection of a first SRS resource set for Beam Management, the second indicator is to indicate a selection of a second SRS resource set for codebook based transmission, and the third indicator is to indicate a selection of a third SRS resource set for non-codebook based transmission.

* * * * *